United States Patent [19]

Kumm

[11] 4,295,836
[45] Oct. 20, 1981

[54] FLAT BELT TRANSMISSION WITH ROTARY ACTUATOR AND INTEGRATED CONTROL SYSTEM

[76] Inventor: Emerson L. Kumm, 1035 E. Laguna Dr., Tempe, Ariz. 85282

[21] Appl. No.: 44,747

[22] Filed: Jun. 1, 1979

[51] Int. Cl.³ .................. F16H 11/02; F16H 55/54
[52] U.S. Cl. .................................. 474/51; 474/53
[58] Field of Search ............... 74/230.16, 230.17 R, 74/230.17 A, 230.17 F, 230.17 M, 230.17 S, 230.18, 230.19, 230.21, 230.23, 859; 474/47, 49, 51, 53, 54, 56

[56] References Cited

U.S. PATENT DOCUMENTS

| | | | |
|---|---|---|---|
| 3,155,019 | 11/1964 | Stiglic | 92/122 X |
| 3,472,099 | 10/1969 | Burez | 74/859 |
| 3,592,104 | 7/1971 | Harness | 92/122 X |
| 3,596,528 | 8/1971 | Dittrich et al. | 74/230.17 F |
| 3,704,634 | 12/1972 | Schrodt | 74/230.17 F |
| 3,731,549 | 5/1973 | Kaiser et al. | 74/230.17 A |
| 3,898,893 | 8/1975 | Hashimoto et al. | 74/859 |
| 3,918,312 | 11/1975 | Espenschied et al. | 74/230.17 F |
| 3,926,020 | 12/1975 | Dantowitz et al. | 74/230.17 F X |
| 4,024,772 | 5/1977 | Kumm | 74/230.17 F |
| 4,068,539 | 1/1978 | Nyc | 74/230.18 |
| 4,094,203 | 6/1978 | van Deursen et al. | 74/230.17 F |
| 4,173,156 | 11/1979 | Horowitz et al. | 74/230.17 M X |

FOREIGN PATENT DOCUMENTS

| | | | |
|---|---|---|---|
| 485468 | 11/1929 | Fed. Rep. of Germany | 74/230.23 |
| 973207 | 2/1951 | France | 74/230.23 |

Primary Examiner—C. J. Husar
Assistant Examiner—Moshe I. Cohen
Attorney, Agent, or Firm—Charles E. Cates; Victor Myer

[57] ABSTRACT

A continuously variable flat belt pulley transmission, using integral rotary actuators, is described together with controls to vary the transmission speed ratio upon demand and simultaneously operate an internal combustion engine or electric motor on a desired torque versus speed schedule.

6 Claims, 9 Drawing Figures

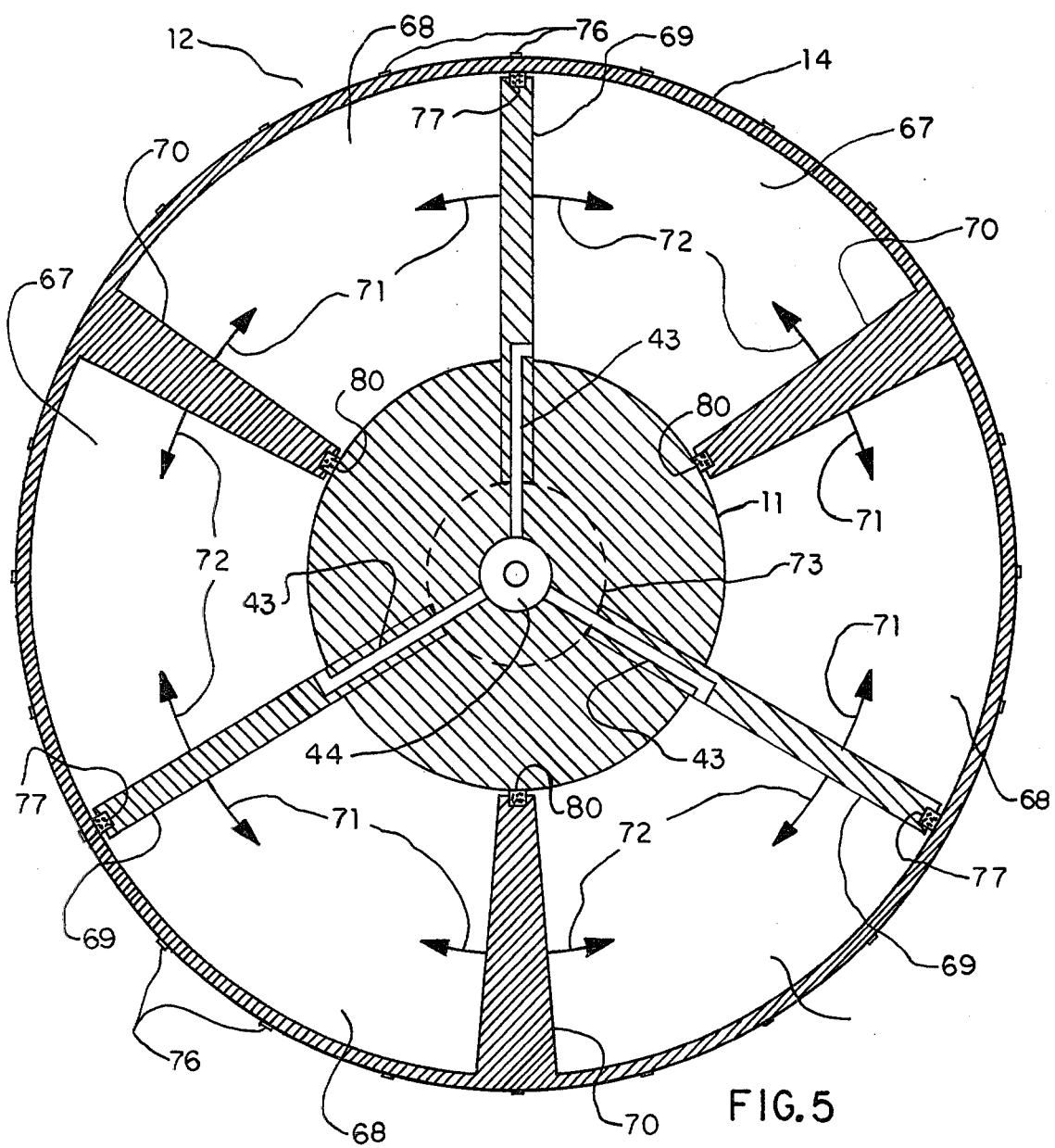
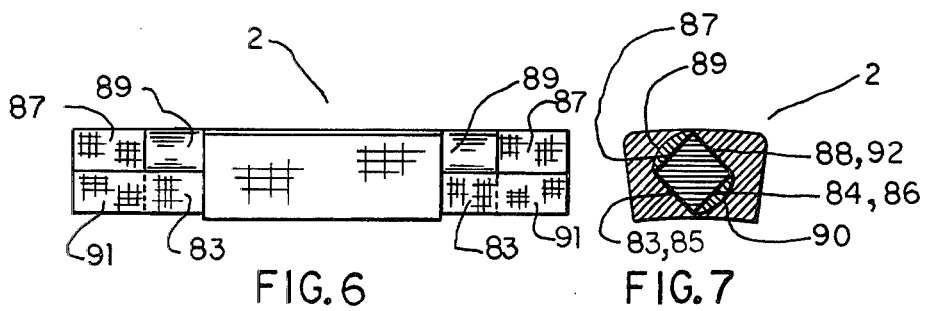

FLAT BELT TRANSMISSION WITH ROTARY ACTUATOR AND INTEGRATED CONTROL SYSTEM

BACKGROUND OF THE INVENTION

This invention relates generally to transmissions of the belt drive type with controls and is more particularly related to the class of variable speed transmissions and the class of engine or motor controls exemplified, in part, by the following patents: U.S. Pat. No. 3,664,206 to Clauss Jr.; U.S. Pat. No. 3,704,634 to Schrodt; U.S. Pat. No. 3,731,549 to Kaiser, et al; U.S. Pat. No. 3,811,331 to Moogk; U.S. Pat. No. 4,024,772 to Kumm; U.S. Pat. No. 3,472,099 to Burez, L.D.; U.S. Pat. No. 3,888,139 to Orshansky, E. Jr.; U.S. Pat. No. 3,939,738 to Adey, et al; U.S. Pat. No. 3,898,893 to Hashimoto, M. et al.

All the transmissions of the patents enumerated above, as well as those of the rest of the prior art, obtain changes in their operating speed ratio by an axial movement of one sheave of each pulley. This feature is in marked contrast to the rotary movement utilized in the present invention which gives reduces size, higher efficiency, greater economy of manufacture and use, simplifier belt replacement and permits incorporation of an integrated control to achieve more optimum overall drive performance, such as when applied to automobiles, driven by either internal combustion or electric motors and/or flywheels.

Present variable speed pulley drives discussed in all the above patents except Kumm are of the type using Vee-belts, which are composed of a rubber composition and have a trapezoidal cross section, the belt transmitting rotary motion at one speed from a source of power, such as an engine or motor, to an output power shaft at another speed, the speed ratio being varied in a continuous fashion from a minimum to a maximum as dependent on the geometry of the belt and pulley system. The Vee-belt is compressed between smooth conical sheave sections in each of two pulleys by external axial forces on the sections to apply tension to the belt and friction between the sides of the Vee-belt and sheave sections to prevent slippage. In operation, a force unbalance caused by changes in the axial loading of the sheave sections causes the Vee-elt to change its radial positions in the two pulleys until a force balance is achieved or a limit range stop is reached. For a large transmitted torque the required axial force exerted on the sheaves results in a large compressive load on the Vee-belt, which requires the belt to have a substantial thickness to prevent axial collapse or failure of the belt. The increase in thickness increases its centrifugal force and causes higher belt tension loads. Also, as the belt thickness increases, pulley size must be increased, due to higher stress loads at a given design minimum pulley radius. Further, the typical Vee-belt ust continuously pull out from the compressive sheave load on leaving the pulley, which results in significant friction losses and belt fatigue, affecting overall efficiency and operating life. Consequently, although variable speed pulley drives have successfully used Vee-belts in a wide range of aplications (industrial drives to snowmobiles and even automobiles) they have been severely limited in their power capabilities for more competitive smaller size equipment. This transmission utilizes the same thin flexible flat belt supported on drive elements similar to that of U.S. Pat. No. 4,024,772, but with totally different more compact sheave and actuator, which reduces the transmission size and volume by eliminating the axial movement of the usual actuators. Also, the efficiency of this transmission is improved by reducing the number of bearings and pulley diameter, and the invention gives a design which permits a more simple belt replacement and maintenance as compared to U.S. Pat. No. 4,024,772. Further, this invention permits the use of smaller actuator forces to give the same belt tension, thus reducing the required fluid pressure and pump work. This invention shows how the fluid pressures required for rotary actuators may be controlled to automatically give the minimum required belt tension, preventing slip over the complete torque, range, thus improving the transmission efficiency by reducing bearing losses. Also, this invention permits a simple practical control for changing the output power and/or speed that may be applied directly to operating internal combustion engines or electric motors on or near their optimum overall efficiency schedules for torque and speed.

BRIEF DESCRIPTION OF THE INVENTION

I overcome the problems associated with the prior art use of axially positioned actuators which change the radial position of the belt by moving one pulley sheave axially with respect to the other by using two axially fixed discs in place of each sheave of the pulley, said discs using oppositely angled guideways for containing and supporting the ends of the drive elements, with the inner discs connected but separated from the outer connected discs. The inner discs of each pulley are connected to one side of pressurized annular chambers in the rotary actuator and the outer discs are connected to the other side of said pressurized annular chambers in the rotary actuator, so that fluid pressure between the radial sides of the chambers comprising the actuators urges the inner and outer discs to rotate in the opposite direction in each pulley. The oppositely angled guideways, which contain the ends of the belt drive elements at the intersection of such guideways, then position the drive elements to a larger or smaller radius about the pulley axis, dependent on the direction of the relative rotation of the inner and outer discs. The torque developed by the annular actuator which rotates with the pulley results in urging the drive elements toward a larger radius on each pulley, thus tensioning the belt as desired to prevent slippage on the drive elements. A larger pressure differential supplied to one annular actuator of the two pulleys will then cause the drive elements to be positioned to a larger radius in that pulley having the larger pressure differential, and results in the drive elements moving to a smaller radius in the other pulley due to the resulting belt tensions and fixed belt length. Hence, by controlling the pressures to chambers in the actuators, the speed ratio of the transmission may be varied over the limits of the pulley geometry while transmitting power at various speeds. This, I avoid the axial movement of conventional continuously variable belt drive pulleys with its larger fluid volume, together with the necessary pulley sheave displacement volume, as well as the bearing required to prevent rotation of the axial moving actuator. However, I still use the highly efficient flat belt that does not have the Vee-belt frictional losses and fatigue on leaving the conventional pulley caused by the compressive force of the sheave, said flat belt also being able to operate at smaller effective pulley radius to higher speed because of its flexibility and thinner thickness. Further, the axially fixed position of the pulleys in my invention does not required the belt to move axially to keep the belt aligned when changing speed ratio as required in other continuously variable belt drives employing axial sheave movement. This factor significantly complicates any design which would place the two actuators on the same side of the pulleys. However, with this invention, both actuators may be easily placed on the same side of the pulleys connected to the input and output shafts, permiting belt replacement to be made directly without removing rotating equipment, i.e., bearings and shafting. Also, both actuators on the same side of the pulleys permits an overhung bearing arrangement, so that only two bearings and one oil seal is required per shaft as compared to three bearings and several oil seals normally required in previous design arrangements. This reduction in bearings and seals improves the efficiency of the drive. My invention may use lower pressures in the rotary actuators to give the belt tension needed to prevent slippage. This is accomplished in part by the increase in the cross sectional area obtained in the rotary actuator of a given width by dividing the total annular fluid space into multiple pressurized pairs of chambers to permit generating a multiple torque compared to that obtained using only one pair of chambers. This is permitted by the invention, since the actuator counter-rotational total movement angle is relative small, i.e. about 92° for a design total angle between guideways of 90° corresponding to the conventional pulley sheave total angle of 90°, to give a drive element radius change of 2.235 to 1.0. (This then gives a speed ratio range of 5:1 for the two pulleys). Allowing for the necessary structure in the actuator then gives three pressurized pairs of chambers in the actuators with the 90° total angle guideways. Such large total angles are not practical with conventional axially positioned pulley sheaves in continuously variable Vee-belt drives, due to the required belt angle for compression loading. Such large total angles also result in excessive volume and space requirment for the actuator movement. However, the required actuator torque for a desired belt tension is reduced as the guidewy design total angle is increased—inversely proportional to the tangent of one half of the total angle between the oppositely inclined guideways. Thus the required actuator pressure to obtain the necesary belt tension is reduced. The centrifugal force due to the weight of the drive elements rotating with the pulley imposes an equal torque in each pulley proportional to the square of the belt velocity. This torque, due to the centrifugal force on the drive elements, is additive to the torque of the actuator. However, such drive element centrifugal generated torque will be only a small fraction of the maximum actuator torque with suitable design of the drive elements. Hence, the control relationships and overall belt tension as given herein are not affected significantly.

I use a gearing arrangement with one gear supported on a shaft helical spline and attached to a collar with thrust bearings which applies to a non-rotating yoke a force proportional to the torque transmitted by the gear. The yoke is pivoted and connected to a lever to apply force to a spool in the torque pressure balance regulator to generate a first circuit pressure of the actuator differential pressures substantially proportional to the gear torque. The complete actuator pressure differential then becomes substantially porportional to the gear torque, since the other second circuit lower pressure is held constant by a pressure regulator when the operator does not demand speed change. Thus the belt tension is increased for large torques to prevent belt slippage and decreased as torques are reduced to give lower bearing losses. However, the hydraulic speed control system aso permits changing the output power and/or speed by operating a speed servo control valve in the lower pressure circuit supplying oil to the second chambers in the actuators. The hydrulic connections to the rotary actuators on the input and output pulleys would be reversed for driving by a flywheel, as compared to an internal combustion engine or electric motor for identical operation of the speed servo control valve. The engine motor will accelerate to a higher speed and power by moving the speed servo control valve spool to initially reduce the load on the engine or motor—i.e., allow the motor to go to a higher speed for the same initial output speed—which then generates more output torque to the wheels with a higher motor to wheel speed ratio and higher motor speed. In the case of transmitting power from a flywheel, the speed servo control valve spool is moved to increase the load on the flywheel by changing the pulley speed ratio to give more output speed, not less, as given in the initial transient for the engine or motor. The hydraulic pressure, of the first circuit, generated for the rotary actuator may be used together with flow from a positive displacement pump driven at a speed proportional to engine or electric motor speed to operate the engine or electric motor on a torque-speed schedule giving best operating efficiency. The schedule control may operate a servo to change either the carburetor throttle position for an Otto cycle internal combustion engine or the fuel flow in fuel injected engine or the voltage applied to an electric motor.

Other advantages will appear from the following description of the system selected for illustration in the accompanying drawings.

IN THE DRAWINGS

FIG. 5 is a sectional view taken through the hydraulic actuator indicated by the line II—II of FIG. 4;

FIG. 6 is an enlarged side view of the belt drive element;

FIG. 7 is an enlarged end view of the belt drive element;

DESCRIPTION

Figure 1:
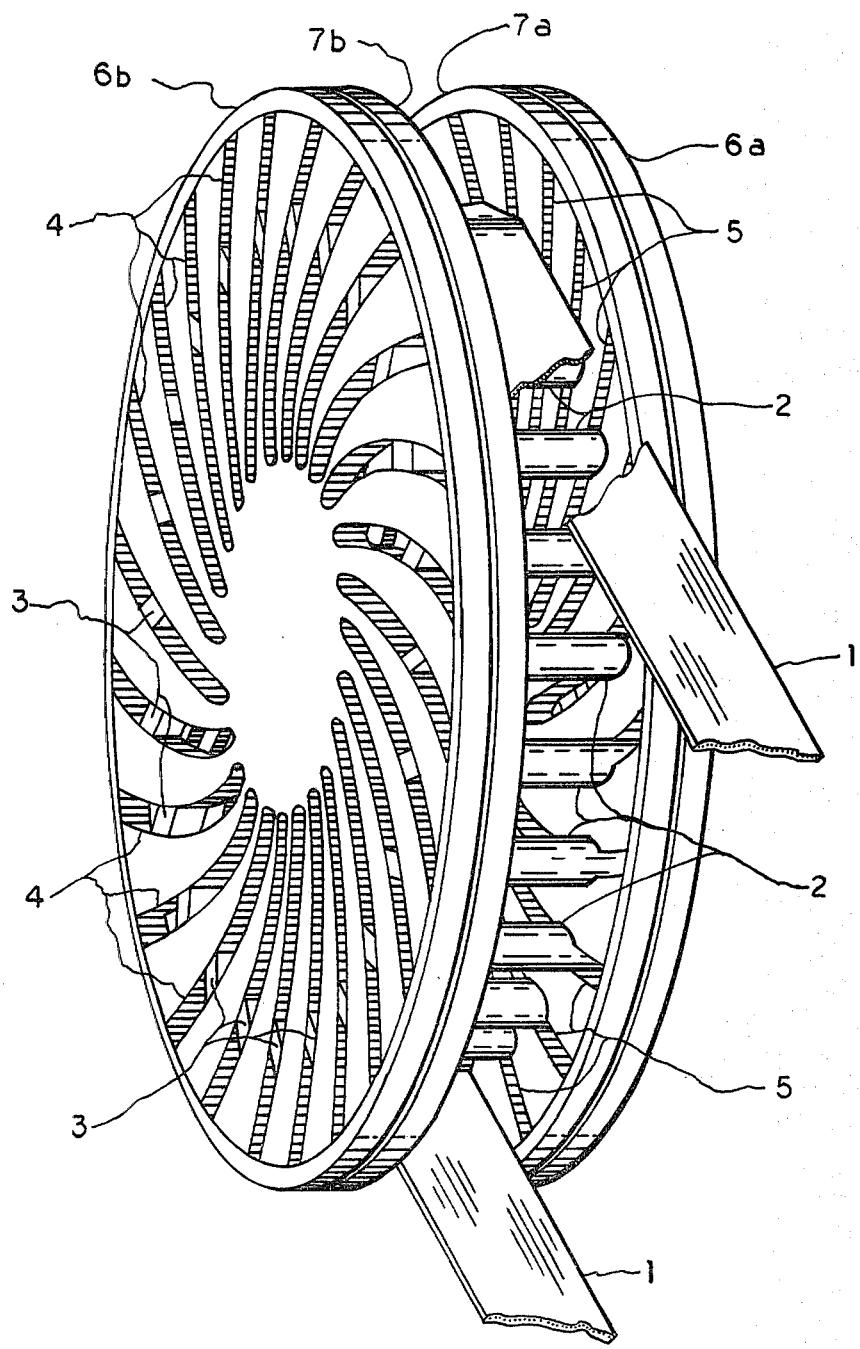
FIG. 1 is a perspective view of one pulley with a portion of a flat belt extending around it, the pulley being formed in accordance with the invention.
Figure 2:
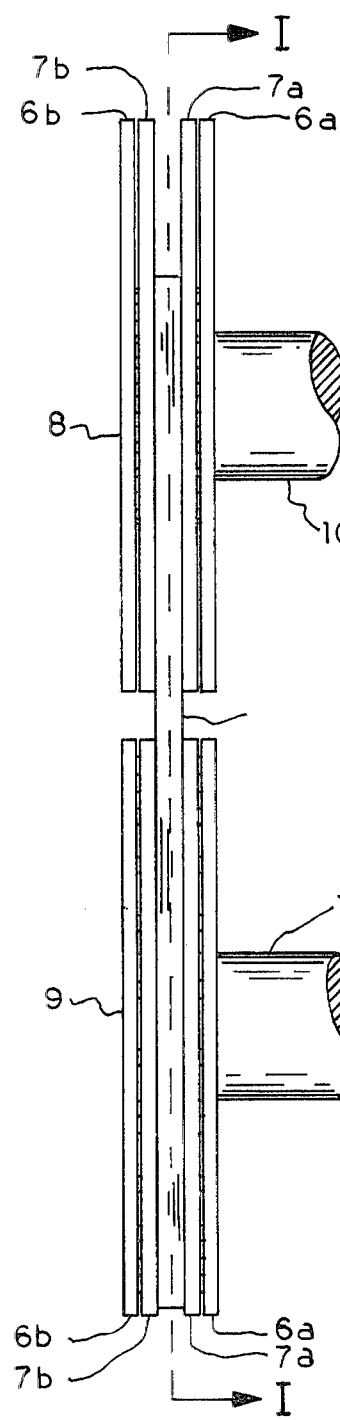
FIG. 2 is a side elevational view of a pair of pulleys employed in the transmission, the flat belt being trained around the pulleys.
Figure 3:
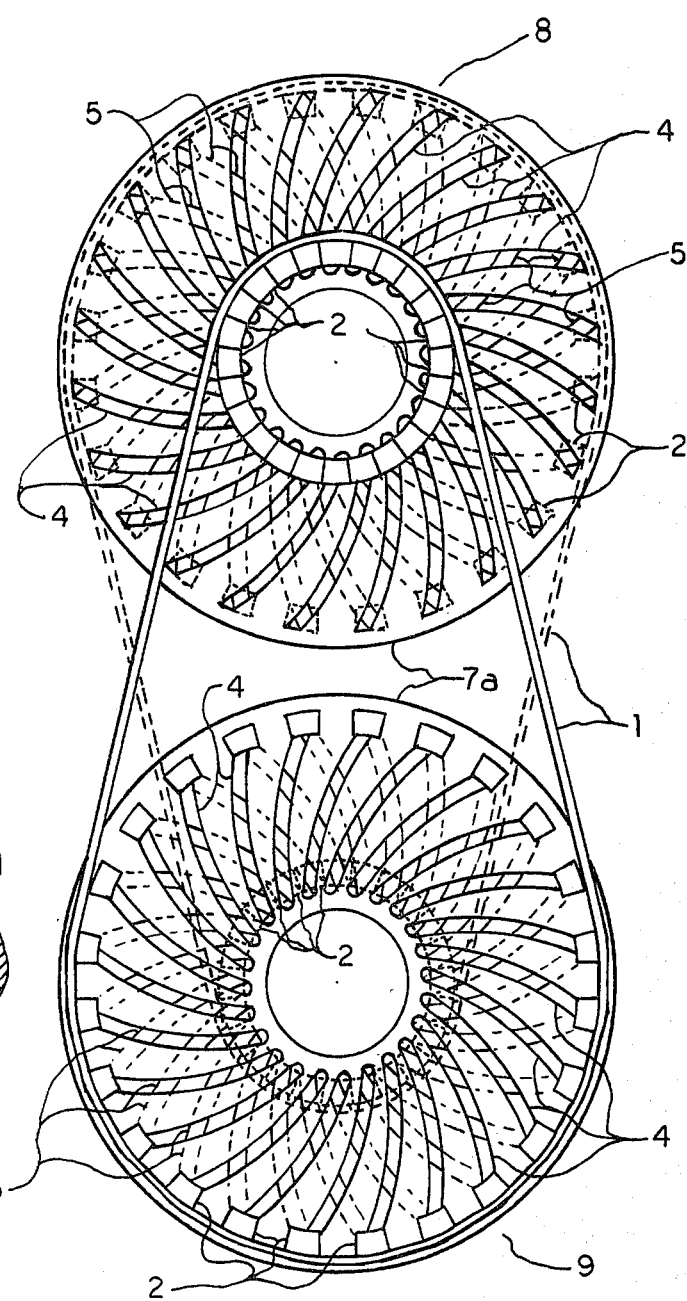
FIG. 3 is a sectional view taken through the pulleys on the plane indicated by the line I—I of FIG. 2.

Referring more particularly to the drawings, and especially FIG. 1, which shows the arrangement of one pulley to have a flat belt 1 extended and tensioned by drive elements 2, which are supported and positioned at their ends 3 in oppositely angled guideways 4, 5 formed in discs 6a, 6b, and 7a, 7b, respectively. As shown in FIG. 2, the flat belt 1 connects the two pulleys 8, 9 and as shown in FIG. 3 is supported and tensioned by the drive elements 2 of the two pulleys. One side of the pulleys 8, 9 is constructed of two discs 6a, 7a, and the other side in constructed of the two discs 6b, 7b. Discs 6a, 6b of the two pulleys 8, 9 are fastened rigidly to shafts 10, 11, respectively and, as will be later shown in more detail, discs 7a, 7b are rigidly connected to each other rotating as a single unit. In FIG. 3 the drive elements 2 being supported and fixed radially by the intersection of the oppositely angled guide ways 4, 5 may then be moved radially outward in pulley 8 by a counter clockwise rotation of disc 7a of pulley 8 relative to disc 6a. Simultaneously, due to the fixed length of belt 1, the drive elements 2 of pulley 9 would be moved radially inward by a clockwise rotation of disc 7a relative to disc 6a all in pulley 9. The maximum and minimum position of the belt 1 and drive elements 2 are shown for the two pulleys 8, 9 by the solid and dashed lines in FIG. 3. A constant guideway angle for the drive elements 2, irrespective of radial position in the disc 6a, may be shown to specify guideways 4 by a logarithmic spiral as follows:

ln $r/r_i = B/\tan A$ r = radial position of guideway 4

$r_i$ = minimum radial position of guideway 4

B = angle around disc 7a

A = angle between guideway 4 and a radial line from the center of the disc 7a

Using the same angle, A, for both guideways, 4, 5 then gives a total angle of 2 A equivalent to the total angle between axially positioned sheaves of conventional pulleys. The above logarithmic spiral may also be approximated quite closely by a simple curve of constant radius having appropriate centers. Assumption of a constant minimum operating friction coefficient between the belt 1 and drive elements 2 that would prevent slippage leads to a requirement that the actuator torque be proportional to the pulley shaft torque and inversely proportional to the tangent of the angle, A, as follows:

$T_A \propto T_s/\tan A$ $T_A$ = actuator torque $T_S$ = pulley shaft torque

This permits a spline of constant helical angle, as will be later described, to be used in a control generating the required fluid pressures automatically to adjust to varying output or input loads, preventing belt slippage. The width of the guideways 4, 5 is determined by the shear strength requirements of the drive elements 2 under maximum load conditions, together with the stressing of the discs 6, 7 to prevent failure. The disc section thickness between guideways 4, 5 in discs 7, 6 respectively, decreases with disc radius to limit the minimum permissible dive element operating radius and consequently, the overall radius ratio possible to achieve with discs 6, 7 of specific size. However, considering all design factors, this approach permits the overall pulley 8, 9 diameter of this design to be significantly smaller than that possible with conventional axially moveable sheaves of continuously variable pulley drives having the same overall radius ratio or speed ratio range. Thus, the distance between pulley shafts may be decreased for a required maximum speed ratio range giving a more compact configuration and lower costs.

Figure 4:
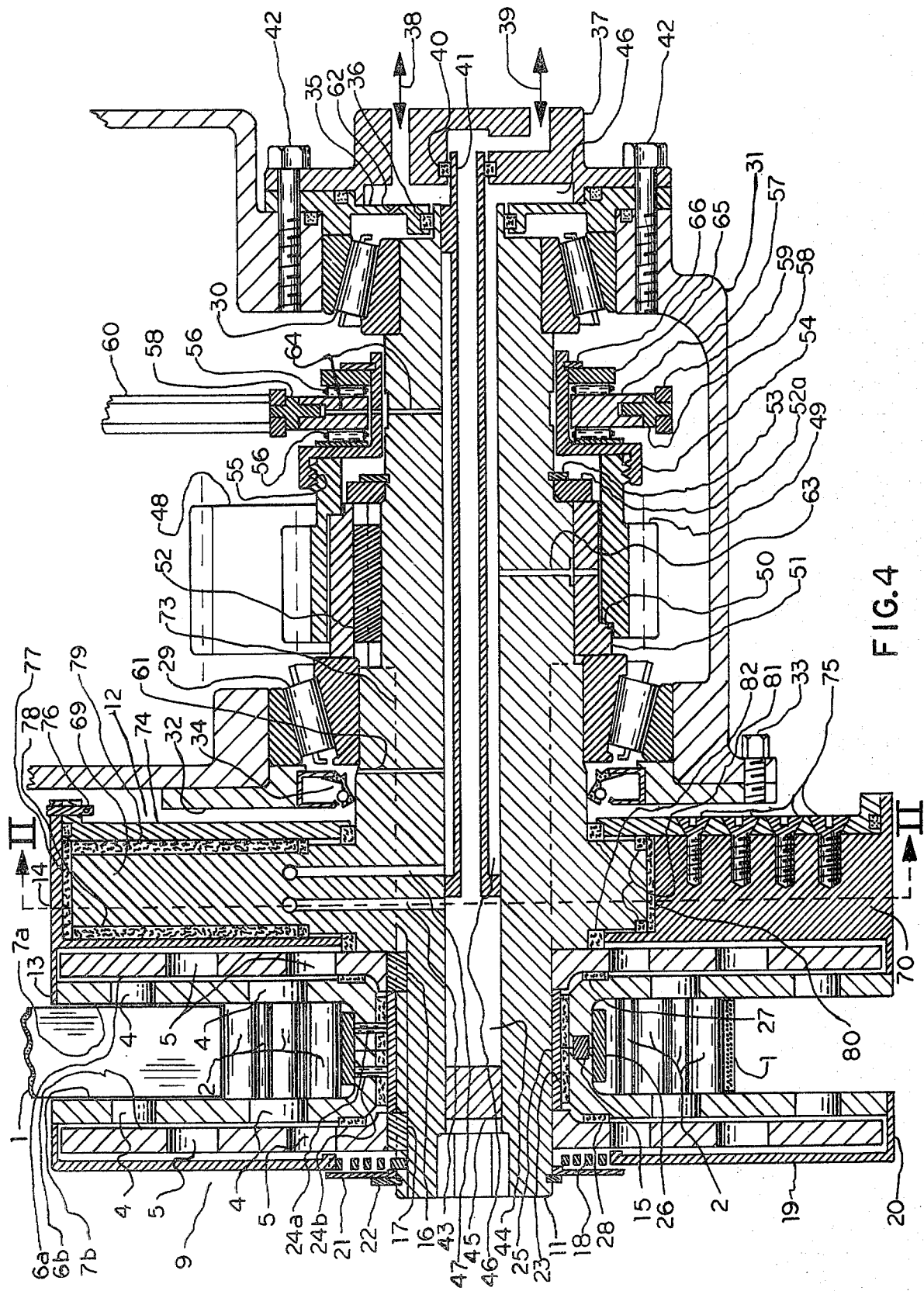
FIG. 4 is an axial sectional view taken through one pulley, its actuator and shafting.

The axial sectional view through one pulley 9, its actutor 12 and shafting 11 is shown in FIG. 4. This preferred arrangement shows the actuator to be attached to disc 7a by a circumferential collar 13, which is part of the actuator case 14. The disc 7a is attached by pin 15 to disc 7b so that discs 7a and 7b rotate as a single element. The collar 13 passes around disc 6a, which is fastened to shaft 11 by key 16. Disc 6b is likewise fastened to shaft 11 by another key 17. A spiral spring 18 is used to keep the belt 1 under a small tension at all times, irrespective of any actutor torque. The spiral spring 18 operates between the shaft 11 and the end plate 19, which has a circumferential collar 20 attached to disc 7b, thus urging the belt drive elements 2 radially outward to tension the belt 1. The end plate 19 also acts as retainer to prevent axial movement of disc 6b and is retained in turn by ring 21, positioned by another retaining ring 22 held in the shaft 11. Discs 7a, 7b are fastened to a solid bearing 23 using pins 24a, 24b respectively, said solid bering 23 having movement on a coller 25. Another collar 26 locks in the pins 24a, 24b. The opposite angled guideways 4, 5 sections are shown in the respective discs 7, 6. Solid bearing rings 27, 28 are used to separate the discs 6a, 7a and 6b, 7b, respectively. The shaft 11 is mounted on tapered roller bearings 29, 30 located in housing 31. Tapered roller bearing 29 is retained by collar 32 fastened to housing 31 by a threaded fastener 33. Collar 32 also incorporates the shaft oil seal 34. Tapered roller bearing 30 is retained axilly by the insert 35, which incorporates an oil seal 36 for the rotating shaft 11. An end cap 37 is used to retain the low pressure fluid 38 and the high pressure fluid 39, separating them by an oil seal 40 located around the end of the shaft oil tube 41. Both the insert 35 and end cap 37 are held against the housing 31 using threaded bolts 42. This arrangement confines the higher pressure oil 39 to the center of the rotating shaft 11 and any leakage past the seal 40 goes into the low pressure oil 38. The high pressure oil 39 passes to and from the rotary actuator 12 using the shaft oil tube 41 and passage 43. The shaft cavity 44 is sealed by a plug 45 to prevent oil leakage. The end of shaft oil tube 41 is brazed or otherwise sealed to shaft 11. Low pressure oil passes to and from the rotary actuator 12 from cavity 46, past the outside of shaft oil tube 41 and through passage 47. Power is transmitted to and from shaft 11, using gear 48 which meshes with shaft gear 49. Shaft gear 49 is splined internally and rides on a helical spline 50 located on a coller 51, which is fastened to shaft 11 by a key 52. The collar 51 is positioned on the shaft 11, using ring 52 and retaining ring 53. When power is transmitted, shaft gear 49 exerts an axial thrust on carrier 54, which is fastened to shaft gear 49 by screw threads 55. The axial thrust from shaft gear 49 is transmitted through the carrier 54 and needle thrust bearings 56 to ring 57. Ring 57 is held from rotating by sliding elements 58 carried in a yoke 59, which is pivoted on an axis transverse to the axis of the rotating shaft 11. The yoke 59 is connected to lever 60, which is used in the hydraulic control system to be described later. Ring 57 with its needle thrust bearings 56 is retained on carrier 54 by a thrust ring 65 and retaining ring 66, so that axial thrust from the splined gear 49 may be transmitted to yoke 59 in either axial direction, depending on whether power is transmitted into or out of the shaft 11. Lower pressure oil 38 through passage 61 is used to lubricate the tapered roller bearing 29 and through passage 62 is used to lubricate the tapered roller bearing 30. Passage 63 gives oil lubrication of the splines 50 and passage 64 gives oil lubrication to the needle bearings 56 and sliding elements 58 attached to yoke 59.

A preferred construction and operation of the rotary actuator 12 is described using both FIG. 4 and FIG. 5, FIG. 5 being a sectional view taken through the hydraulic actuator indicated by the line II—II of FIG. 4. As shown on FIG. 5, the fluid pressure actuator 12 incorporates three high pressure annular chambers 67 and three low pressure annular chambers 68. High pressure fluid flows to and from the chambers 67 via the passages 43 from cavity 44. Low pressure fluid flows to and from the chambers 68 via the passages 47. Both passages 43 and 47 are located in the shaft struts 69. The shaft struts 69 and the case struts 70 define the radial sides of the pressurized chambers 67, 68. The pressure differential between chambers 67, 68 urges the rotary actuator to move in the direction given by arrows 71 of FIG. 5. This relative rotary motion between the actuator case 14 and shaft 11 is restricted as previously described by the fixed length of belt 1 around the drive elements 2 as positioned by the radial intersection of the angled guideways 4, 5 in the two pulleys 8, 9. If the pressure differential in the rotary actuator 12 of pulley 8 is made larger than the pressure differential in the rotary actuator 12 of pulley 9, then the rotary actuator 12 of pulley 9 will move in the direction of arrows 72, causing the belt drive elements 2 of pulley 9 to be positioned to a smaller radial position. This would result in pulley 9 then going to a higher speed relative to the speed of pulley 8, as shown on FIGS. 2 and 3. Consequently, changes in the fluid pressure 38 and/or 39 at the shaft 10, 11 of pulleys 8, 9 respectively, may be used to rapidly change overall operating speed ratio by the relative motion of case and shaft in the rotary actuators 14. The shaft 11 and shaft struts 69 may use a brazed assembly-portion indicated by dash line 73. The rotary actuator 12 includes a side plate 74 that is attached to the case struts 70 by screws 75 and by pins 76. Solid strip seals 77, 78, 79, 80 prevent fluid leakage between the high pressure and low pressure chambers 67, 68 in the rotary actuators 12. Fluid leakage to the environment from the pressurized chambers 67, 68 is prevented by ring seals 81, 82 shown in FIG. 4. The movement of the actuators 12 with the pulleys 8, 9 causes the fluids in the chambers 67, 68 to develop pressure due to their density and speed of rotation but such rotation generated pressures in the chambers 67, 68 balance each other due to both chambers 67, 68 being completely filled with fluid. Hence the speed of rotation does not affect the control pressure differential.

An enlarged longitudinal view of the drive element 2 is shown in FIG. 6 together with an end view in FIG. 7. The drive element 2 may use different cross-sectional shapes for the center section which engages the belt. Low cost cylindrical center sections are illustrated in FIG. 1 and 4 that would be suitable for modest torques and speeds. The center section cross-sectional shape having higher cost shown in FIGS. 3, 6, and 7 permits higher torque loading and speed with less flexing of the belt. This is due to the larger radius of curvature of the belt contacting surface of the drive element 2 in FIGS. 3, 6, and 7. A cross-section, substantially trapezoidal, may be used with the outer surface having a radius of curvature equal to the minimum radial position, as shown in FIGS. 3 and 7. The belt 1 presses against the center portion of the drive element 2 to load surfaces 83 against the angled disc guideways 7b, 7a, and to load surfaces 84 against the angled disc guideways 6b, 6a. Surfaces 83, 84 would be treated to provide low friction bearing surfaces with lubricating material 85, 86 that will conform to the large radius of curvature of the angled guideways 6, 7. The upper end surfaces 87, 88 act only to confine the drive element to the angled guideways 6, 7 with infrequent and minor loads. The end surfaces 89, 90 face the angled guideway 7b, 7a passage openings, respectively. The end surfaces 91, 92 face the angled guideway 6b, 6a passage openings, respectively.

Figure 8:
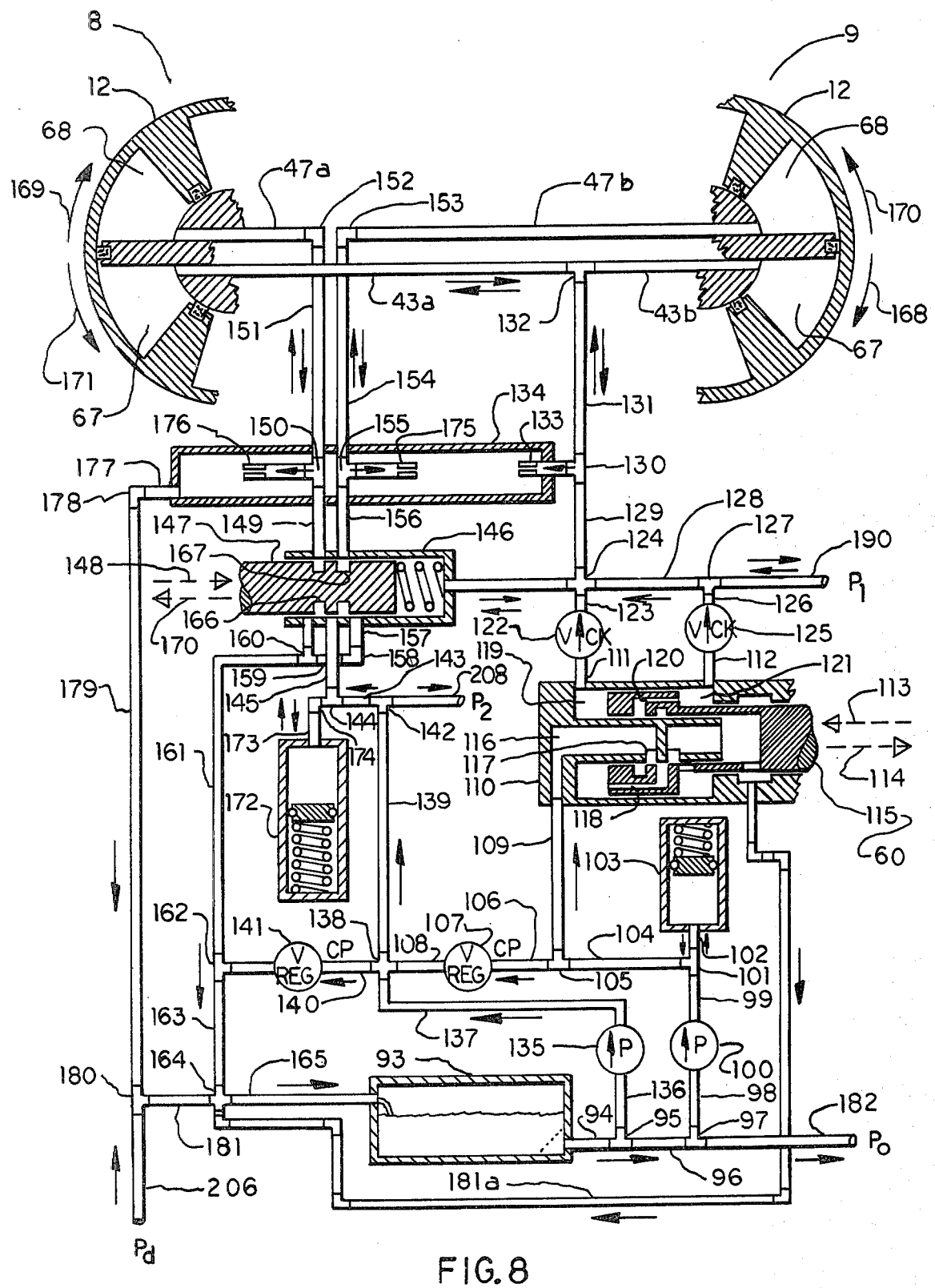
FIG. 8 shows a hydraulic speed control system that may be used in the operation of changing the speed ratio of the transmission.

A hydraulic speed control system that may be used to change the speed ratio of the transmission during operation in a continuously variable fashion is shown in FIG. 8. Here the two rotary actuators 12 for pulleys 8, 9 are shown diagrammatically with low pressure oil passage 47a, 47b in a second circuit, and high pressure oil passage 43a, 43b in a first circuit. Oil from a reservoir 93 is transferred through pipe 94, tee 95, pipe 96, tee 97, pipe 98 to the high pressure pump 100 in the first circuit and discharged through pipe 99 and tee 101. A portion of the oil flow from tee 101 may intermittently be discharged through pipe 102 to accumulator 103. The remainder of the oil flow from tee 101 in the first circuit discharges through pipe 104 to tee 105. A portion of the hydraulic flow from tee 105 passes through pipe 106 to the high pressure regulator 107, which maintains a constant pressure upstream of the regulator 107 by varying the discharge flow in pipe 108 to the low pressure system. The remaining portion of the high pressure oil flow in the first circuit is discharged from tee 105, through line 109 to the torque pressure balance regulator 110, which generates a discharge pressure, $P_1$, in pipe 111 or 112, which is proportional to the force 113 or 114, respectively, on the regulator spool 115. The force 113, 114 is applied to the regulator spool 115 by a lever 60 attached to a yoke 59, as shown in FIG. 4 and as previously discussed results from the thrust on a helically splined gear 49 during operation of the pulley 9, thus giving a force 113, 114 proportional to the splined gear 49 torque. Movement of the regulator spool 115 in the direction of the force 113 causes high pressure oil in the first circuit to pass from pipe 109, through passage 116, through a port 117, passage 118, into cavity 119 to exert a pressure, $P_1$, on the regulator spool opposite to the direction of the force 113. The geometry of the system may be chosen for balance of loads in the regulator to obtain a desired value for $P_1$ as related to the splined gear 49 torque that will result in adequate tension to prevent slip of the belt 1 due to the torque exerted by the rotary actuators 12 loaded by the $P_1$ pressure. A force 114 resulting from a power transfer in the opposite direction in helically splined gear 49 causes the regulator spool to move in the direction of the force 114 to discharge high pressure oil from passsage 116, through port 117, passage 120 into cavity 121 to exert a pressure, $P_1$, on the regulator spool opposite to the direction of the foce 114. Consequently, dependent on the direction of the force, 113 or 114, an oil pressure, $P_1$ is generated in cavity 119 or 121 respectively, which is always proportional to the force, 113 or 114 and which causes an oil flow to pass respectively either through pipe 111, check valve 122, pipe 123 to cross 124 or through pipe 112, check valve 125, pipe 126, tee 127, pipe 128 to cross 124. The oil flow to the actuators 12 then passes from cross 124 through pipe 129, tee 130, pipe 131, tee 132 and pipe 43a or 43b. It should be observed that the operation of the rotary actuator 12 of pulley 9 that reduces its volume 67 will increase the volume 67 of the rotary actuator 12 in pulley 8 in a reciprocal fashion. While this effect is not equal in all positions over the operation range, it reduces the required transient makeup flows significantly. However, it is still necessary to incorporate in the first circuit sufficient bleed flow on the high pressure oil system to give good regulation of the pressure, $P_1$. This may be accomplished to some degree by seal leakage but is shown here by a flow from tee 130 through flow restrictor 133 into the gear box 134. Low pressure oil, $P_2$, for the rotary actuators 12 is furnished in the second circuit in part by the discharge from the low pressure pump 135 which is supplied with oil from reservoir 93 through pipe 94, tee 95, and pipe 136, and discharges such oil through pipe 137 to cross 138, where it adds to the oil flow from pipe 108 to supply the oil flow in pipe 139 and pipe 140. A low pressure regulator 141 attached to pipe 140 holds the pressure upstream of the regulator 141 to a constant relatively low pressure, $P_2$. This low pressure oil is supplied in the second circuit via pipe 139, tee 142, pipe 143, tee 144, pipe 145 to the speed demand servo 146. Movement by the operator of servo valve spool 147 in the direction 148 causes the low pressure oil to pass in the second circuit through servo valve passage 166, pipe 149, tee 150, pipe 151, elbow 152, pipe 47a to pressurize rotary actuator chamber 68 in pulley 8. Simultaneously, rotary actuator chamber 68 in pulley 9 is being depressurized, since it is connected through pipe 47b, elbow 153, pipe 154, tee 155, pipe 156, servo valve passage 167, pipe 157, elbow 158, pipe 159, tee 160, pipe 161, tee 162, pipe 163, cross 164, pipe 165, back to reservoir 93. Consequently, the pressure differential in the rotary actuator 12 of pulley 9 is increased, causing its actuator case to move in the direction of the arrow 168, urging the drive elements 2 of pulley 9 to a larger radius. At the same time, the pressure differential in the rotary actuator 12 of pulley 8 is decreased, causing its actuator case to move in the direction of the arrow 169, permitting the belt 1 force on the drive elements 2 of pulley 8 to urge the drive elements 2 of pulley 8 toward a smaller radius. Thus, a movement of the speed demand servo valve spool in the direction 148 increases the speed of pulley 8 relative to the pulley 9. If pulley 9 is driven by a rotating high speed flywheel and pulley 8 were connected to a load, such as the wheels of a vehicle, then movement of the speed demand servo valve spool 147 in the direction 148 would result in additional torque being supplied from the flywheel to accelerate the vehicle to a higher speed. Conversely, if the speed demand servo valve spool 147 were moved in the direction 170, the low pressure oil supplied from pipe 146 would presurize chamber 68 in pulley 9 and reduce the pressure in chamber 68 in pulley 8. Hence, the movement of the actuator cases are now given by the direction of arrows 170a and 171 to reduce the speed of pulley 8 relative to pulley 9. With a flywheel connected to pulley 9 and vehicle wheels connected to pulley 8, such action would result in slowing the vehicle down and speeding up the flywheel. The accumulator 172 supplies additional oil flows through pipe 173, elbow 174 to tee 144, so that the low pressure oil pump 135 in the second circuit does not have to be sized for the maximum transient flow needed for rapid actuator operation. It is also desirable to incorporate bleed flow restrictors 175, 176 on the low pressure oil system to obtain good pressure control and such bleed flow restrictors can be used as lubrication jets for bearings, moving splines and gears. Such oil discharges in the second circuit from flow restrictors 133, 175, 176 may then be collected in the gear box 134 and drained through pipe 177, elbow 178, pipe 179, tee 180, pipe 181, cross 164, pipe 165, back to the reservoir 93.

Figure 9:
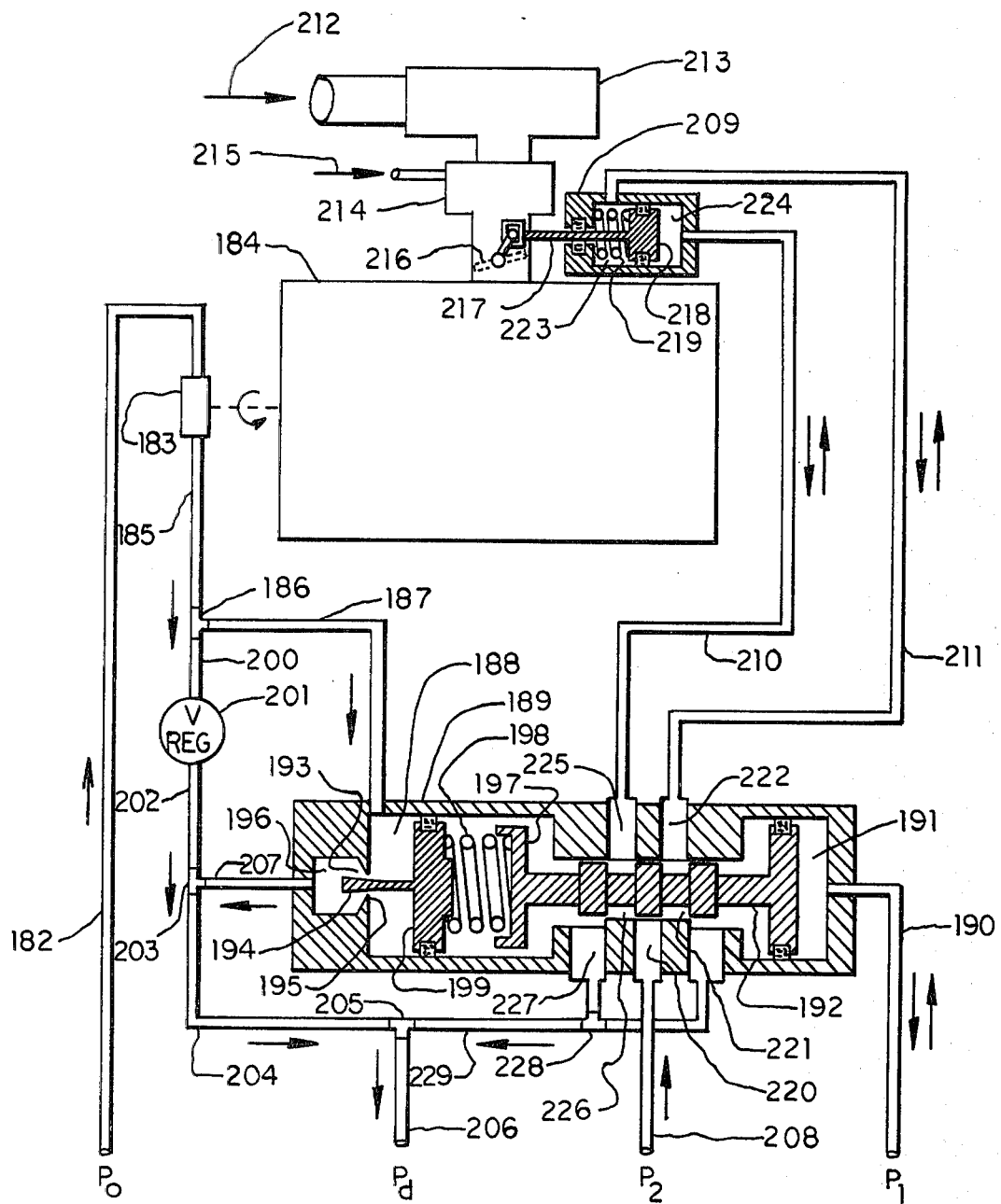
FIG. 9 shows a hydraulic control system to schedule an internal combustion Otto cycle engine operation using the hydraulic transmission control system of FIG. 8.

The hydraulic speed control system of FIG. 8 can also use an internal combustion engine or electric motor drive if applied in combination with the schedule control of FIG. 9. In this case, the preferred operation of the speed control servo spool is reversed in certain respects from the operation, using a flywheel input power. This is because it is desirable when the operator demands higher output speed to permit the motor or prime mover, such as an internal combustion engine or electric motor, to accelerate such prime movers to a higher input speed to give a higher transmission output torque, due to the higher gear ratio through the transmission. Deceleration to a lower output speed may be achieved directly by reducing the internal combustion engine air and/or fuel or voltage as applied to an electric motor. Combinations of these control techniques for acceleration and deceleration are also practical. The preferred schedule control arrangement for this invention uses four hydraulic oil connections, i.e. $P_o$, $P_d$, $P_1$, $P_2$ to the hydraulic speed control system of FIG. 8, as shown on FIG. 9. Oil from the reservoir 93 passes through pipe 94, tee 95, pipe 96, tee 97, pipe 182 to a positive displacement pump 183, which operates at a speed directly proportional to the speed of the engine 184. Oil is discharged from pump 183 through pipe 185, tee 186, pipe 187 to a cavity 188 in the schedule servo control regulator 189. The high pressure oil, $P_1$, of the first circuit used in the hydraulic speed control system of FIG. 8 is supplied through pipe 190 to a cavity 191 in the schedule servo control regulator 189. The pressures in cavities 191, 188 act to exert a force on the schedule servo control spool 192, the direction of such a force depending on the magnitude of the pressure, $P_1$, in cavity 191, as compared to the pressure generated by the positive displacement pump 183 in cavity 188. The pressure of the oil in cavity 188 is dependent on the size of the opening 193 between a pintle 194 and an orifice 195 situated between cavity 188 and cavity 196. Under all equilibrium engine operating conditions—any desired speed and power—the servo spool 192 (which moves only slightly in transients) will have resumed a substantially identical axial position, thus giving an identical axial position to the platform 197, holding the spring 198. The compression or axial length of the spring 198 varies precisely with the force on piston 199, due to oil pressure in cavity 188. Since piston 199 is attached to the pintle 194, it is then preceived that the pintle 194 has a singularly precise position in the orifice 195, dependent only on the pressure in cavity 188, which under equilibrium conditions, must balance the force due to the pressure in cavity 191. Hence, the pintle may be contoured to vary the size of the open area 193 for oil discharge flow to obtain nearly any single valued curve for oil pressure in cavity 188, as a function of engine speed. The required movement of the pintle is decreased significantly by incorporating a bypass oil flow for the oil discharge from the positive displacement pump 183, which then operates to limit the oil flow to cavity 188 from that which would otherwise be supplied if used with an engine having a large speed range. The bypass oil discharges from tee 186, through pipe 200 to the pressure regulator 201, which operates to limit the maximum pressure generated by the positive displacement pump 183, discharging oil through pipe 202, tee 203, pipe 204, tee 205, pipe 206, back through tee 180, pipe 181, tee 164, pipe 165 to the resevoir 93 of FIG. 8. Oil is also discharged from cavity 196 through pipe 207 to tee 203 to join the flow ultimately ending in reservoir 93. Since the pressure, $P_1$, is proportional to the transmission shaft 11 torque of pulley 9, connecting the engine to the input gear 48 of FIG. 4 would then make the pressure, $P_1$, proportional to the engine torque. The hydraulic schedule servo control regulator will then give a desired schedule of engine torque versus engine speed under equilibrium conditions for the servo control spool 192 in the schedule control regulator 189. Low pressure oil, $P_2$, is supplied the second circuit through pipe 208 to the schedule control regulator 189, and is directed to the engine throttle actuator 209 through pipe 210 or 211. The engine air flow 212 passes through a filter 213 into a carburetor 214 where fuel 215 is added. The fuel-air mixture flow is throttled by a butterfly 216, which is opened or closed by a shaft 217 connected to a piston 218 in the throttle actuator 209. The throttle actuator is loaded by spring 219 to start the engine 184 with the butterfly 216 in the closed position. Hence, if the engine torque exceeds the desired scheduled value for the speed at which the engine is then operating, the pressure, $P_1$, in cavity 191 causes a force exceeding the force due to the pressure in cavity 188, causing the schedule servo spool 192 to move toward the cavity 188. This causes the low pressure oil, $P_2$, to flow through passages 220, 221, 222, pipe 211 to cavity 223 in actuator 209. Also, oil is discharged from cavity 224 through pie 210, passages 225, 226, 227, tee 228, pipe 229 to tee 205 to join other flows being discharged back to the reservoir 93. The resulting pressure differential in the actuator 209 causes the throttle butterfly to move toward the closed position, reducing the air-fuel flow to the engine 184. The engine output power and torque decrease, causing the pressure, $P_1$, to decrease, results in lower force on the schedule control regulator spool, moving said spool away from cavity 188 back toward equilibrium position, which then holds the butterfly throttle 216 in a stationary position. If the engine torque is less than the desired schedule value for the speed at which the engine is then operating, the pressure, $P_1$, in cavity 191 is less than the pressure in cavity 188, causing the schedule servo spool 192 to move away from the cavity 188. This causes a reversal of flows in pipes 210, 211, from the previously discussed case and results in the actuator shaft 217 moving to cause the butterfly throttle 216 to open, thus increasing the fuel-air flow to the engine. This then increases the output engine power and torque, thereby increasing $P_1$ and once again brings the schedule control regulator spool 192 back to an equilibrium position wherein no flows pass through pipes 210, 211, causing the butterfly throttle 216 to remain in a stationary position. Thus, an operator may demand any output power within the capability of the engine at any operating speed by moving the speed demand servo control spool 147 to change directly the transmission speed ratio, using the rotary actuators 12 on the pulleys 8, 9 with the schedule control of FIG. 9 automatically adjusting engine 184 power to follow a desired torque-speed schedule such as would give minimum fuel consumption at all operating speeds. The same operating arrangement as given in FIG. 8 can also be applied to an electric motor drive by using the hydraulic actuator 209 to operate control means for varying the voltage and/or current supplied to the motor.

While but a single form of the drive arrangement for the rotary actuator and its control as applied to a flywheel, internal combustion engine, or electric motor power input that embodies the features of the invention has been shown and described, it will be obvious to those skilled in the art that many minor variations may be made in the construction and relation of the parts without departing from the spirit and scope of the invention as shown and described herein.

I claim:

1. A variable diameter pulley comprising two spaced, axially fixed sheaves, each having an inner and outer rotatable disc, said inner discs being rigidly interconnected and said outer discs being rigidly interconnected, means in said inner and outer discs defining oppositely angled, intersecting guideways, and drive elements having means for movably engaging said guideways at their intersections, said inner and outer rotatable discs including at least one pair of first and second chambers and means for exerting variable fluid pressure within said chambers, whereby, responsive to changes in the differential fluid pressure of said first and second chambers, said inner and outer discs rotate relative to each other for producing a radial shift of position of the intersections of said guideways and their associated drive elements, thereby changing the effective diameter of said pulley.

2. The pulley of claim 1 having three pairs of first and second chambers.

3. A variable-speed flat belt transmission comprising a plurality of cooperating pulleys including at least one pulley made according to claim 1 and a flat belt operatively engaging the drive elements of said pulleys.

4. The drive of claim 3 with the addition of means for adjusting the tension on said belt in proportion to transmission torque.

5. The drive of claim 4 wherein the tension adjusting means comprises means for supplying a signal proportional to the transmission torque of an associated motor and means responsive to said signal for rotating said discs in a direction to increase the effective diameters of both.

6. The drive of claim 4 wherein the tension adjusting means comprises means for exerting pressure in said first chambers proportional to the transmission torque of an associate motor.

* * * * *